(12) United States Patent
Kamata (10) Patent No.: US 7,248,793 B2
(45) Date of Patent: Jul. 24, 2007

(54) LENS-FITTED PHOTO FILM UNIT

(75) Inventor: Kazuo Kamata, Minami-Ashigara (JP)

(73) Assignee: Fujifilm Corporation, Tokyo (JP)

( * ) Notice: Subject to any disclaimer, the term of this patent is extended or adjusted under 35 U.S.C. 154(b) by 313 days.

(21) Appl. No.: 11/077,163

(22) Filed: Mar. 11, 2005

(65) Prior Publication Data

US 2005/0201739 A1    Sep. 15, 2005

(30) Foreign Application Priority Data

Mar. 11, 2004    (JP)    ............... 2004-069450

(51) Int. Cl.
  *G03B 17/02*    (2006.01)
  *G03B 15/03*    (2006.01)
(52) U.S. Cl. ............... 396/6; 396/164; 396/179
(58) Field of Classification Search ............ 396/6, 396/155, 159, 164, 176, 179, 505
   See application file for complete search history.

(56) References Cited

U.S. PATENT DOCUMENTS 6,086,267 A * 7/2000 Tsuzuki et al. ............ 396/459
6,714,728 B2 * 3/2004 Moriya et al. ............ 396/6

FOREIGN PATENT DOCUMENTS

| JP | 2000-352800 | 12/2000 |
| JP | 2003-344914 | 12/2003 |

* cited by examiner

*Primary Examiner*—W. B. Perkey
*Assistant Examiner*—Rishi S. Suthar
(74) *Attorney, Agent, or Firm*—Young & Thompson (57) ABSTRACT

A lens-fitted photo film unit provides a daylight photography mode to select no flash emission and the small stop, a daylight synchro photography mode to select normal flash emission and the small stop, and a night view synchro photography mode to select reduced flash emission and the large stop. The small stop is composed of the small stop aperture of f/16 and an ND filter of transmittance of 25% to be attached to cover the small stop aperture. The shutter speed is set at 1/64 sec. in any modes. The photo film preloaded in the lens-fitted photo film unit has ISO sensitivity 3200. The stable photographing is achieved under the wide range of brightness by the changeover of the stop, without the change of the shutter speed. In brightness of EV 9 to 11, the exposure amount becomes proper either in the daylight photography mode and in the night view synchro photography mode.

8 Claims, 6 Drawing Sheets

LENS-FITTED PHOTO FILM UNIT

BACKGROUND OF THE INVENTION

1. Field of the Invention

The present invention relates to a lens-fitted photo film unit having plural photographic modes.

2. Description of the Related Art

A lens-fitted photo film unit preloaded with an unexposed photo film is widely known. A lens-fitted photo film unit, in which photographic modes are selectable according to the various photography conditions in a range from bright place such as outdoors to a dark place, is known. The kind of lens-fitted photo film unit is disclosed in JP-A 2003-344914 and is commercially available as "Night&Day (product name)" from the applicant.

The above lens-fitted photo film unit can work in three different modes, a daylight photography mode which has no flash emission, a night view synchro photography mode and a daylight synchro photography mode which have flash emission. The daylight photography mode is used for photography in a bright place such as outdoors. The night view synchro photography mode is used for photography of a dark subject such as a night view or for photography of a main subject such as a person with a background such as a night view or a dark room while photographing the background at a proper density. In the daylight photography mode and the daylight synchro photography mode, a small stop and a high shutter speed are selected. In the night view synchro photography mode, a large stop and a low shutter speed are selected.

JP-A 2003-344914 discloses the lens-fitted photo film unit using a photo film of ISO sensitivity 1600. In the daylight photography mode and the daylight synchro photography mode, the shutter speed is set at ⅟₁₀₀ sec. and the f-number is f/14. In the night view synchro photography mode, the shutter speed is set at ⅟₄₅ sec. and the f-number is f/5.6.

When the daylight photography mode or the daylight synchro photography mode is selected, the shutter speed is set at high by reducing rotary angle of a shutter blade by a shutter speed changeover mechanism. As to the f-number, a fixed stop plate which corresponds to a large stop is disposed in a photographic lens. The shutter speed changeover mechanism is used for inserting a stop plate, on which a small stop is formed, to cover the fixed stop plate when the daylight photography mode or the daylight synchro photography mode is selected.

The lens-fitted photo film unit "Night&Day (product name)" has the same structure as the lens-fitted photo film unit disclosed in JP-A 2003-344914, except that the shutter speed is set at ⅟₁₂₀ sec. in the daylight photography mode or daylight synchro photography mode, and the f-number is f/6.2 in the night view synchro photography mode.

JP-A 2000-352800 discloses a lens-fitted photo film unit which is suitable for various photographic conditions from a bright place to a dark place, by changing over the shutter speed and the transmission light amount of the photographic lens. In this lens-fitted photo film unit, an ND filter is inserted in the photography optical path in cooperation with turning off of the flash switch, to reduce the exposure amount. Moreover, in a manner similar to the lens-fitted photo film unit disclosed in JP-A 2000-344914, the shutter speed is set at high by reducing rotary angle of the shutter blade.

However, there are problems in JP-A 2003-344914 and JP-A 2000-352800 that the shutter speed changeover mechanism is likely to operate at undesirable shutter speed due to unstable movement of the shutter blade. In addition, there are problems that the manufacturing cost is increased due to the increase in number of parts for changing over shutter speed, and that the size of the lens-fitted photo film unit is enlarged.

Incidentally, maximum brightness of photographing scene is generally considered to be the exposure value (EV) 16 with the photo film of ISO sensitivity 100. The photographing scene in the range of EV15 to EV16 is approximately 1% among the all photographing opportunities. It is noted that the proper EV using the photo film of ISO sensitivity 100 is obtained with substitution of the f-number "f", the shutter speed "T", and the film sensitivity "S" by the following equation:

$$EV = \log_2(f^2/T) - \log_2(S/100)$$

For example, brightness of EV16 means proper brightness in the photography taken with the f-number, the shutter speed and the film sensitivity to meet EV16.

For example, when proper EV is set at EV10 about 1% among the all photographing opportunities in the daylight photography of the lens-fitted photo film unit, there causes overexposure beyond the latitude of the photo film, even allowing overexposure of +5 considering the latitude of the color negative film. Moreover, problems arise in that the whole image of the printed photo made from the overexposed frame becomes pinkish, and the developing cost is increased due to the prolonged printing time.

When proper EV is set at EV12 in the daylight photography of the lens-fitted photo film unit, lower limit within the latitude on the underexposure side is EV10. However, it is known that there are few users who recognize the brightness of EV10 to EV9 to be dark. Therefore, there is no problem caused from such overexposure as described above when the proper EV in the daylight photography is set at EV12. Even though the lens-fitted photo film unit is designed to have night view synchro photography mode which permits the brightness of EV10 to EV9, most of the users photograph in daylight photography mode, without shifting to the night view synchro photography mode. As a result, a proper photo print cannot be obtained.

Besides, the photography of a night view or a person with a night view background would be appropriately photographed under the proper EV values of equal to or less than EV6 with the photo film of ISO sensitivity 100. As described above, the inventors have found out that the proper EV in daylight photography is set in the vicinity of EV11, and the proper EV in night view photography is EV6.

In the lens-fitted photo film unit, in order to set the proper EV at 11 in daylight photography and at 6 in night view photography only by an aperture changeover mechanism, the combination of the shutter speed of ⅟₁₂₈ sec. (officially ⅟₁₂₀ sec.), f/2.8 in daylight photography and f/16 in night view photography, and the photo film of ISO sensitivity 1600 is considered. However, f/2.8 is not practical for the lens-fitted photo film unit which is manufactured at low cost, and constituted of one or two plastic taking lenses.

When the photo film of ISO sensitivity 3200 is used and the shutter speed is set at ⅟₆₄ sec. (officially ⅟₆₀ sec.) to overcome/deal with the camera shake, the f-number in night view photography can be f/5.6 which is practical level. However, in this case, f-number in daylight photography mode is f/32. Problems arise in that image quality is generally decreased due to diffraction of light at the stop when the f-number is more than f/22.

SUMMARY OF THE INVENTION

In view of the foregoing, it is a primary object of the present invention to provide a lens-fitted photo film unit which is able to give/offer proper exposure amount for the wide range of brightness.

It is another object of the present invention to provide a lens-fitted photo film unit which is able to give/offer proper exposure amount for the wide range of brightness by using the aperture changeover mechanism only.

In order to achieve the above and other objects, a photo film of ISO sensitivity 3200, a shutter device in which shutter speed of the shutter device is set at 1/64 sec., an aperture changeover means for controlling exposure amount on the photo film in cooperation with the photography mode selection device are provided. The aperture changeover means is set in a small stop state when the first photography mode is selected, and is set in a large stop state when the second photography mode is selected. In the small stop state, the exposure amount is controlled by a first aperture of f/16 and an ND filter having transmittance of 25%, and in the large stop state, the exposure amount is controlled by a second aperture of f/5.6. The first photography mode is a daylight photography mode and the second mode is a night view synchro photography mode.

The aperture changeover means includes a large stop plate fixed in the photography optical path, and an aperture changeover plate being movable in and out of the photography optical path. The second aperture is formed on the large stop plate. The first aperture is formed on the aperture changeover plate, and the ND filter covers the first aperture.

In the preferred embodiment of the present invention, a flash device turned on or off in cooperation with the photography mode selection device is included. The flash device is set in OFF state in the daylight photography mode and is set in ON state in the night view synchro photography mode.

A flash light amount adjusting device is included for changing over flash light of the flash device to one of a normal state and a reduced light state in cooperation with the photography mode selection device. The flash light is set in the normal state in the daylight photography mode and daylight synchro photography mode, and is set in the reduced light state in the night view synchro photography mode. The flash light amount adjusting device includes a light-shielding plate for partially shielding front of the projector of the flash device, in which the light-shielding plate is set away from the front of the projector in the normal state, and the light-shielding plate is set in front of the projector in the reduced light state. An index plate which cooperates with said photography mode selection device is included. The index plate is comes into the viewfinder in the night view synchro photography mode, to display that the night view synchro photography mode is selected.

According to the present invention, it is possible to photograph at the stable shutter speed, and also possible to prevent deteriorations of an image formed on the photo film caused from diffraction phenomenon at the stop. Moreover, it is possible to obtain excellent photographing, to prevent failure of photographing caused by improper selection of the photography mode.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
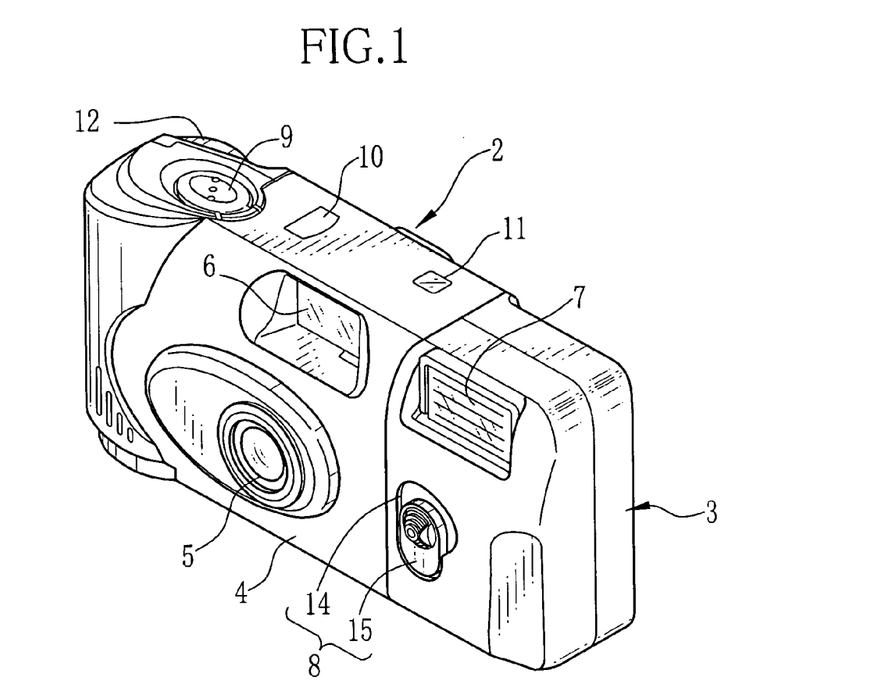
FIG. 1 is an external perspective view illustrating a lens-fitted photo film unit according to the present invention which is set in a daylight photography mode.

In FIG. 1, a lens-fitted photo film unit 2 comprises a unit body 3 provided with various mechanisms for taking an exposure, a photo film cassette loaded in the unit body 3 at the time of manufacture, and a label 4 wound around to be attached to the periphery of the unit body 3. Various openings are formed on the label 4 for uncovering some portions of the unit body 3.

A front side of the unit body 3 is provided with a taking lens 5, a viewfinder 6, a flashlight emitter 7, a photography mode selection device 8 and soon. An upper side of the unit body 3 is provided with a shutter release button 9, a counter window 10, a signal opening 11 and so on. In a rear side of the unit body 3, a winding wheel 12 partially appears, and is used to wind the photo film.

Figure 2:
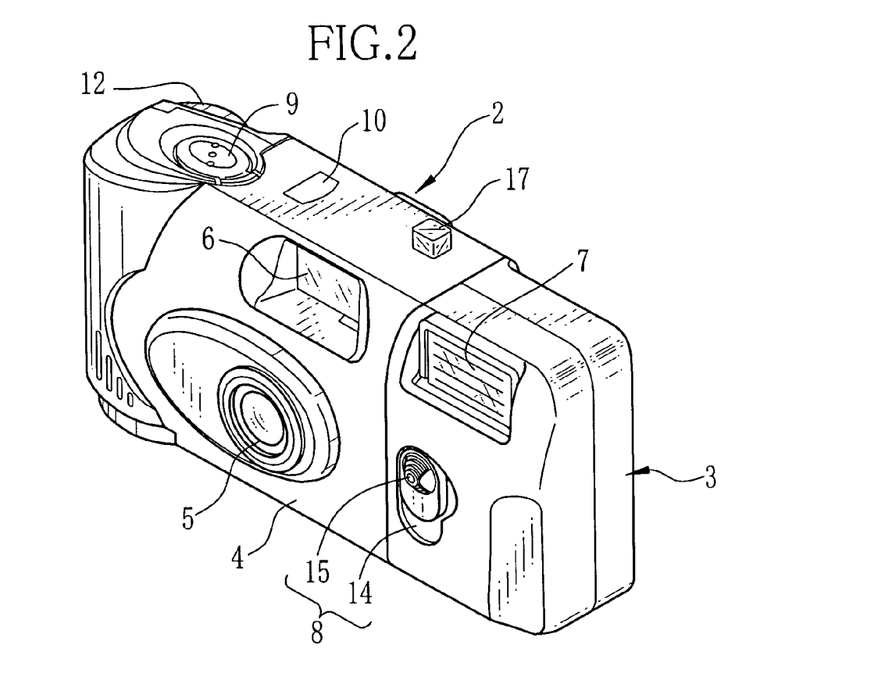
FIG. 2 is an external perspective view illustrating the lens-fitted photo film unit which is set in a daylight synchro photography mode.
Figure 3:
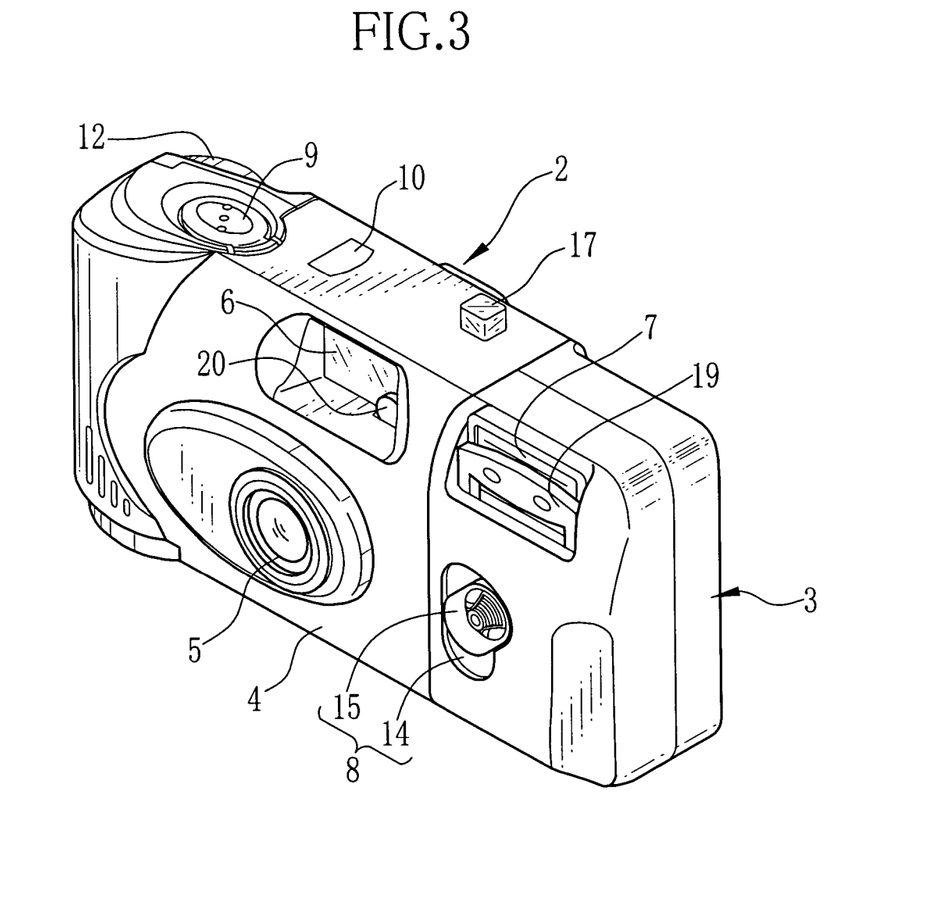
FIG. 3 is an external perspective view illustrating the lens-fitted photo film unit which is set in a night view synchro photography mode.

The photography mode selection device 8 includes an operation member 15 and an operation opening 14 formed in a front face of the unit body 3. The operation member 15 has substantially an oval shape and is movable in the operation opening 14. The operation member 15 is movable among an daylight photography position to be placed on the downside of the operation opening 14, a daylight synchronizing position to be slid up from the daylight photography position as illustrated in FIG. 2, and a night view synchronizing position to be rotated clockwise from the daylight synchronizing position as illustrated in FIG. 3.

When the operation member 15 is set in the daylight photography position, the lens-fitted photo film unit 2 becomes in a daylight photography mode where a flash device is turned off and a small stop is selected. When the operation member 15 is set in the daylight synchronizing position, the lens-fitted photo film unit 2 becomes in a daylight synchro photography mode where the flash device is turned on the small stop is selected. In the daylight synchro photography mode, a signaling member 17 projects from an upper face of the lens-fitted photo film unit 2. The signaling member 17 guides light emitted by a light emitting element outside the unit body 3 upon completion of charging the flash device, to inform the completion of charging the flash device.

When the operation member 15 is in the night view synchronizing position, the lens-fitted photo film unit 2 becomes in a night view synchro photography mode where the flash device is turned on and the large stop is selected. In the night view synchro photography mode, alight reducing member 19 is set in front of the flashlight emitter 7, to reduce an amount of flash light. An index plate 20 is disposed in the viewfinder 6. The index plate 20 is movable in and out of the viewfinder 6. When the index plate 20 is in the viewfinder 6, a user is informed that the lens-fitted photo film unit 2 is set in the night view synchro photography mode.

The shutter speed is set at 1/64 second (officially 1/60 second) in any photography modes. The f-number of the large stop used for the night view synchro photography mode is set to f/5.6. The f-number of the small stop is set to approximately f/32.

Figure 4:
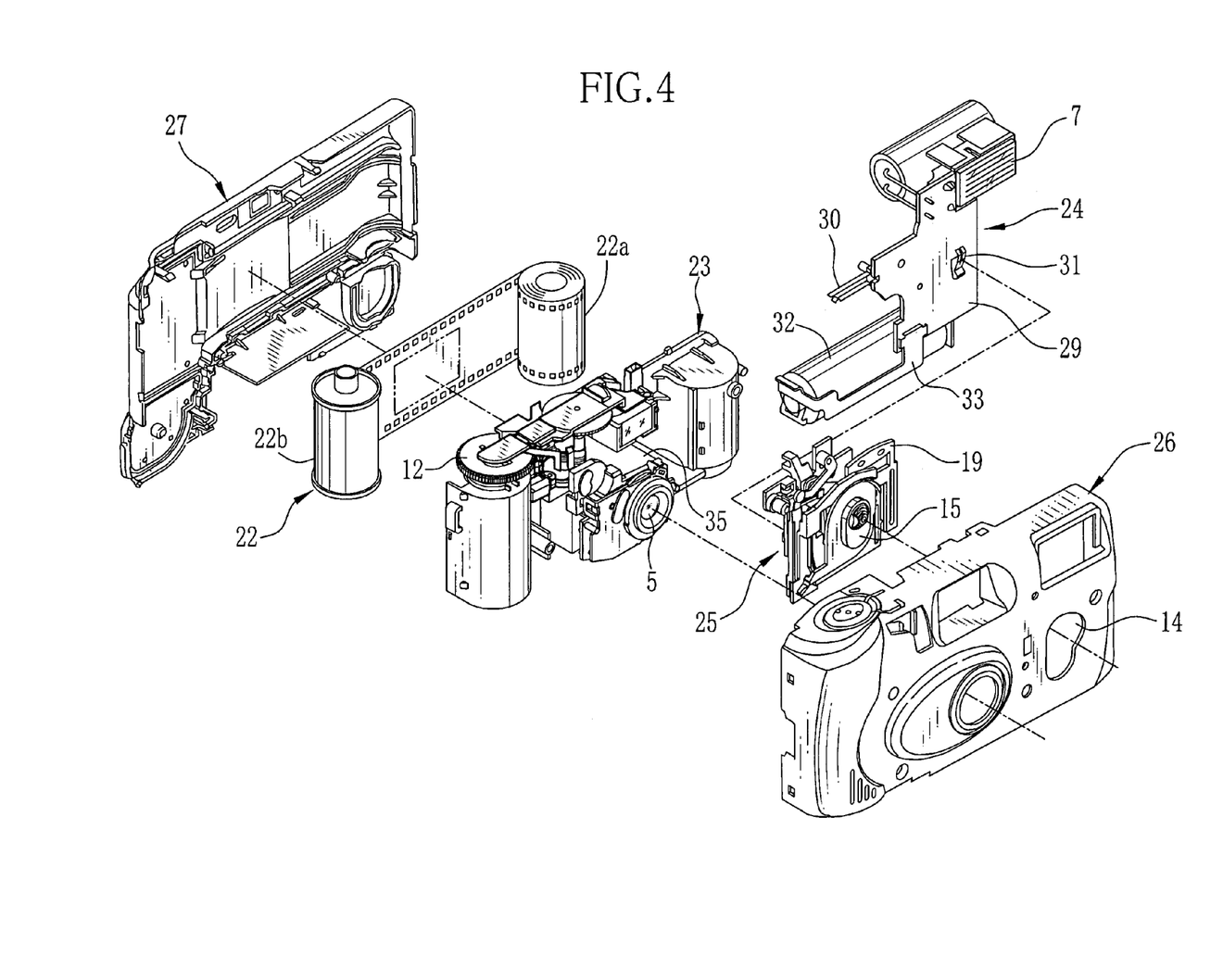
FIG. 4 is an exploded perspective view illustrating the lens-fitted photo film unit.

Constitution of the unit body 3 is now described in FIG. 4, the unit body 3 includes a body base 23, a flash unit 24, a mode switching mechanism 25, a front cover 26 and a rear cover 27. The body base 23 is loaded with a photo film cartridge 22. The flash unit 24 is secured to a front face of the body base 23. The mode switching mechanism 25 changes over the photography modes. The front and rear covers 26 and 27 are respectively attached to the front and rear sides of the body base 23.

The photo film cartridge 22 is a 135 type and comprises a photo film 22a and a cartridge 22b. A color negative film of ISO sensitivity 3200 is used for the photo film 22a.

The flash unit 24 is composed of a printed circuit board 29 having circuit elements to form a flash circuit and the flashlight emitter 7 including a flash discharge tube, a reflector, a diffusion plate and the like. The printed circuit board 29 is provided with a sync-flash switch 30, a metal contact 31 and a battery contact 33. The sync-flash switch 30 actuates the flash light emission in cooperation with the opening and closing of a shutter blade. The metal contact 31 constitutes a light emission selecting switch turned on and off by the movement of the operation member 15 of the photography mode selection device 8. The battery contact 33 connects a battery 32 to the flash circuit. When the light emission selecting switch is turned on, charging for flash emission is conducted to allow flash emission. When the light emission selecting switch is turned off, charging for flash emission is stopped to inhibit flash emission.

A light shielding barrel 35 is provided at the center on the front surface of the body base 23. Various elements are disposed on the periphery of the light shielding barrel 35, a shutter device, a photo film winding mechanism, a photo film retention mechanism, a frame counter mechanism, an aperture changeover mechanism, a photographic optical system and a viewfinder optical system.

Figure 5:
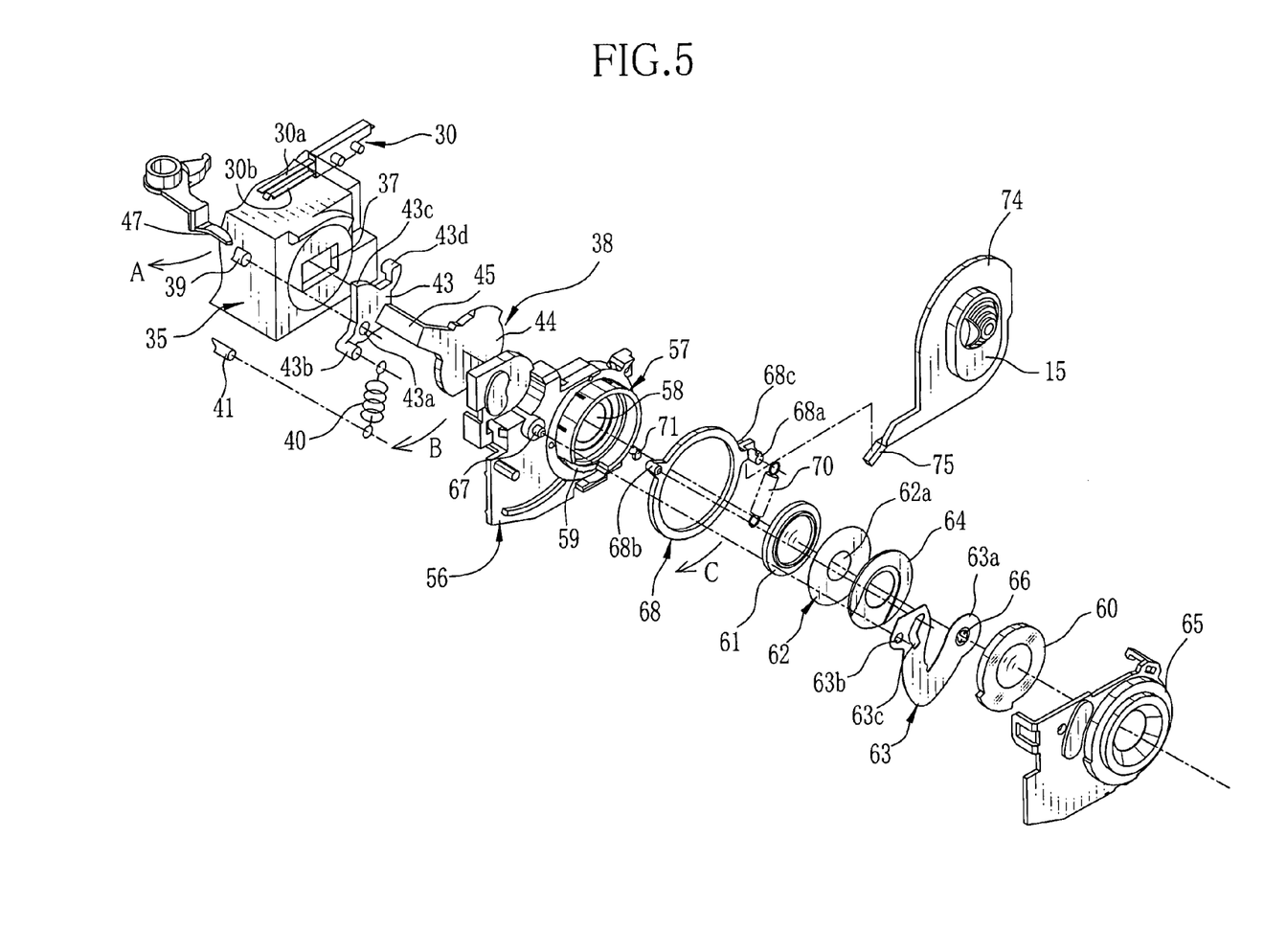
FIG. 5 is an exploded perspective view illustrating an aperture changeover mechanism.

In FIG. 5, an exposure opening 37 is formed in the front of the light shielding barrel 35. A pin 39 for supporting a shutter blade 38 in swingable manner and another pin 41 for catching one end of a spring 40 are provided in a lateral side/face of the light shielding barrel 35. The shutter blade 38 constituting a shutter mechanism includes a base section 43 having a hole 43a for receiving the pin 39, an open/close section 44 disposed in front of the exposure opening 37, to open and close the exposure opening 37, and a coupling section 45 for connecting the base section 43 and the open/close section 44. The base section 43 is provided with a pin 43b for catching the other end of the spring 40, a projection 43c knocked by a shutter drive lever 47 and a sync projection 43d for activating the sync-flash switch 30 in the flash unit 24. The shutter blade 38 is biased by the spring 40, and is kept in a close position to close the exposure opening 37.

The shutter drive lever 47 is an element included in the shutter device, and rotates in the clockwise direction ("A" direction) toward a charging position in cooperation with the film winding. In the shutter releasing operation, the shutter drive lever 47 rotates in opposite to the "A" direction toward a releasing position.

The shutter drive lever 47 knocks the projection 43c of the shutter blade 38 during rotation to the releasing position from the charging position. The shutter blade 38 responsively rotates to an open position in the "B" direction against the bias of the spring 40. The shutter blade 38 contacts a stopper pin (not shown) provided in a lens holder 56, and then returns to the close position by the bias of the spring 40. By adjusting the rotary angle between the close position and the open position of the shutter blade 38, bias of the spring 40 and the like, the shutter speed is kept at 1/64 second.

The sync-flash switch 30 includes an upper metal contact 30a and a lower metal contact 30b. When the shutter blade 38 rotates toward the open position, the sync projection 43d presses the upper metal contact 30a, to contact the lower metal contact 30b. When the emission selecting switch is turned on and the sync-flash switch 30 is turned on by the contact between the upper and lower switch segments 30a and 30b, the flash light is emitted from the flashlight emitter 7 in the flash unit 24.

A lens holder 56 is attached to the front side of the light shielding barrel 35. A lens barrel 57 is formed at the center on front surface of the lens holder 56. A photographing opening 58 is formed in the lens barrel 57. A cutout 59 is formed in a lateral side of the lens barrel 57. First and second plastic lenses 60 and 61 to constitute the taking lens 5 are contained in the lens barrel 57. A large stop plate 62, an aperture changeover plate 63 and a spacer 64 which constitute the aperture changeover mechanism are placed between the first and second lenses 60 and 61.

A lens retention plate 65 is attached to the front of the lens holder 56 for keeping the elements inside the lens barrel 57 such as the taking lens 5, and a switching ring 68 mounted on the periphery of the lens barrel 57.

The large stop plate 62 is circular thin plate and has a large stop aperture 62a formed at the center. That is, the diameter of the large stop aperture 62a is designed so that the f-number thereof is set to f/5.6.

Figure 6:
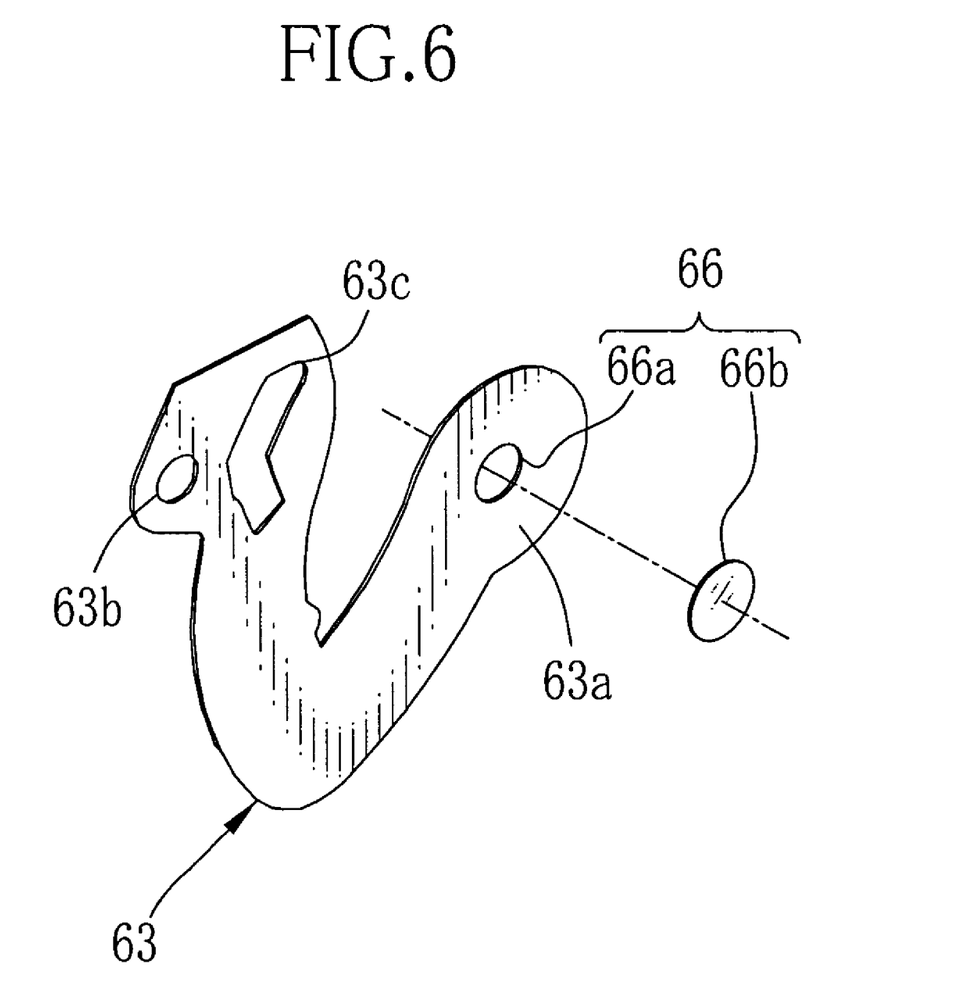
FIG. 6 is an exploded perspective view illustrating a small stop.

The aperture changeover plate 63 is a V-shaped thin plate and its one end portion 63a forms into a circular disk to close the large stop aperture 62a. A small stop portion 66 is provided in the center of the end portion 63a. As shown in FIG. 6, the small stop portion 66 includes a small stop aperture 66a formed at the center of the end portion 63a and an ND filter 66b stuck on the end portion 63a to close the small stop aperture 66a.

The diameter of the small stop aperture 66a is designed so that the f-number is set at f/16. Moreover, the ND filter 66b has transmittance of 25%. Thus the small stop aperture 66a of f/16 and the ND filter 66b having transmittance of 25% are combined, so that the small stop portion 66 has an ability to control light amount equivalent to that of f/32 while preventing deteriorations of an image formed on the photo film caused by diffraction phenomenon. The diameter of the small stop aperture 66a and transmittance of the ND filter may be changed arbitrarily to achieve the ability to control light amount equivalent to that of f/32. Moreover, the ability to control light amount may be that of more than f/32.

There are a hole 63b and a long hole 63c formed in the other end of the aperture changeover plate 63. A pin 67 formed in the vicinity of the lens barrel 57 in the lens holder 56, is inserted in the hole 63b and keeps the aperture changeover plate 63 swingable. The aperture changeover plate 63 moves the end portion 63a in and out of the lens barrel 57 from the cutout 59, swinging between a large stop position to expose the large stop aperture 62a, and a small stop position to cover the large stop aperture 62a.

The switching ring 68 fits in the periphery of the lens barrel 57 in rotatable manner. The switching ring 68 includes a spring hook pin 68a for catching one end of the spring 70, a linking pin 68b inserted in the long hole 63c of the aperture changeover plate 63, and a follower pin 68c. The follower pin 68c projects toward the rear side, and is pressed by the photography mode selection mechanism.

The other end of the spring 70 is hooked on a pin 71 formed in the lower portion in the front side of the lens holder 56 to bias the switching ring 68 in the "C" direction. Note that the switching ring 68 is kept in a predetermined position in connection with the aperture changeover plate 63.

In the operation member 15, a transmission plate 74 of substantially oval shape is formed integrally. A pressing lever 75 projects from the transmission plate 74 in a horizontal direction. When the operation member 15 is rotationally shifted from the daylight synchronizing position to the night view synchronizing position, the pressing lever 75 of the transmission plate 74 pushes the follower pin 68c of the switching ring 68 from the downside. Therefore, the switching ring 68 rotates in the counterclockwise direction.

Figure 7:
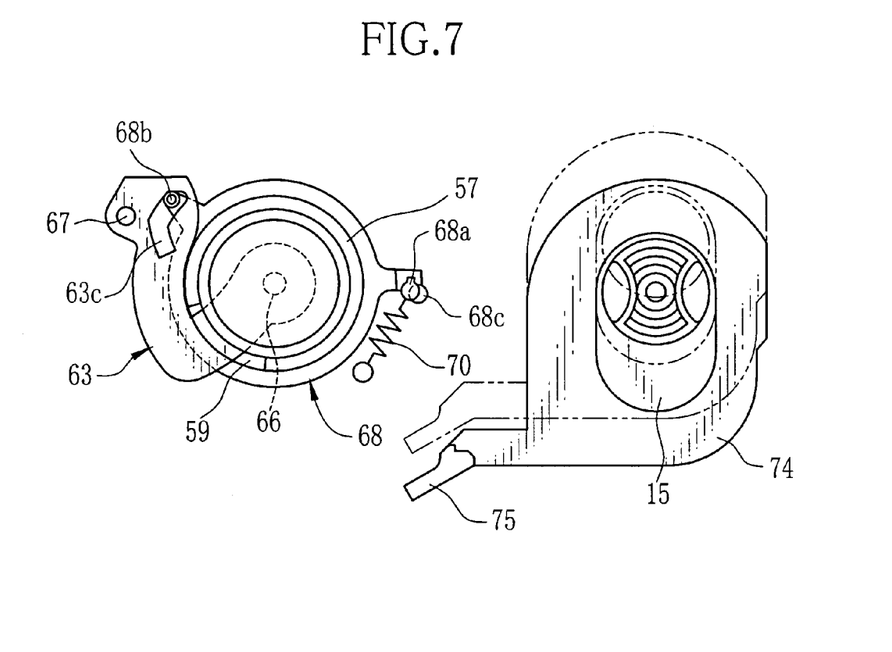
FIG. 7 is an explanatory view illustrating the aperture changeover mechanism which is set in the daylight photography mode and the daylight synchro photography mode.

In FIG. 7, states of the switching ring 68 in the daylight photography mode and the daylight synchro photography mode are illustrated. In FIG. 7, position of the operation member 15, the transmission plate 74 and the pressing lever 75 in the daylight photography mode are illustrated by a solid line and those in the daylight synchro photography mode are illustrated by a chain double-dashed line.

When the operation member 15 is in the daylight photography and the daylight synchronizing positions, the pressing lever 75 of the operation member 15 does not contact the follower pin 68c of the switching ring 68. Thus, the switching ring 68 is kept in the initial position. When the switching ring 68 is in the initial position, the aperture changeover plate 63 is kept in the small stop position where the end portion 63a is inserted in the photography optical path in the lens barrel 57. Thereby, light amount is controlled by the small stop portion 66 to be in a state of small stop.

Figure 8:
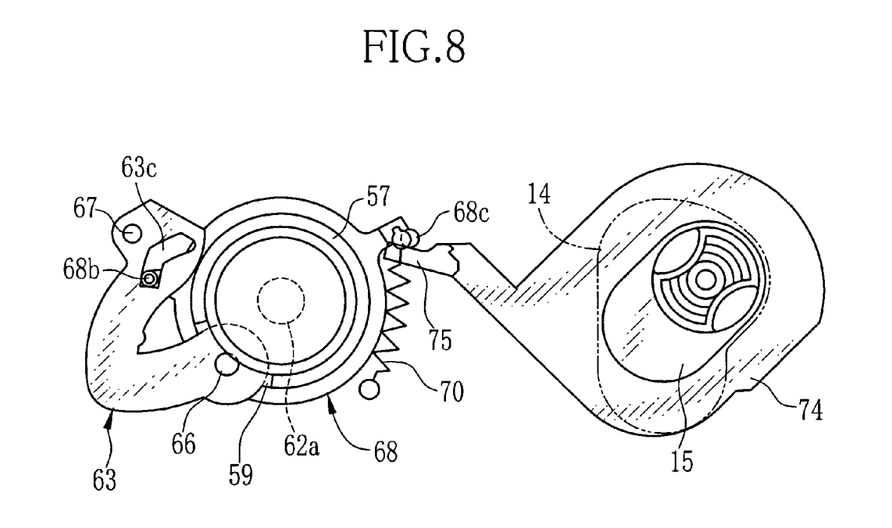
FIG. 8 is an explanatory view illustrating the aperture changeover mechanism which is set in the night view synchro photography mode.

In FIG. 8, the operation member 15 is rotated from the daylight synchronizing position to the night view synchronizing position. The pressing lever 75 pushes the follower pin 68c from the downside, and causes the switching ring 68 to rotate in the counterclockwise direction (reverse direction of "C" in FIG. 5). In response, the aperture changeover plate 63 pressed by the linking pin 68b rotates in the clockwise direction, so that the end portion 63a moves out of the photography optical path to the large stop position. Thereby, light amount is controlled by the large stop plate 62 to be set in a large stop state.

It is noted that the signaling member 17, the light reducing member 19, the index plate 20 and the metal contact 31 constituting the light emission selecting switch will work with the operation member 15 through the mode switching mechanism 25. By the slide of the operation member 15 from the daylight photography position to the daylight synchronizing position, the signaling member 17 projects from an upper face of the lens-fitted photo film unit 2 and the light emission selecting switch is turned on. By the slide of the operation member 15 from the daylight synchronizing position to the night view synchronizing position, the index plate 20 and the light reducing member 19 respectively project in front of the viewfinder 6 and the flashlight emitter 7.

As described above, in the lens-fitted photo film unit, the photo film of ISO sensitivity 3200 is used for the photo film 22a and the shutter speed is set at 1/64 sec. In the daylight photography mode and the daylight synchro photography mode, the small stop portion 66 has ability to control light amount equivalent to that of f/32, and the proper exposure value (EV) is EV11 with the photo film of ISO sensitivity 100. Moreover, in the night view synchro photography mode, the f-number is f/5.6 and the proper exposure value (EV) is EV6. It is noted that the proper exposure value (EV) using the photo film of ISO sensitivity 100 is obtained by substitution of the f-number "f", the shutter speed "T", and the film sensitivity "S" in the following equation:

$$EV = \log_2(f^2/T) - \log_2(S/100)$$

The operation of the above construction is explained now. When daylight photography, which does not require flash emission, is performed outdoors, the operation member 15 is slid down in the operation opening 14 to select daylight photography mode as shown in FIG. 1.

When the operation member 15 is set in the daylight photography position, the switching ring 68 is set in the initial position. The aperture changeover plate 63 is set at the small stop position where the end portion 63a is inserted in the photography optical path.

In the photographing by pressing the shutter release button 9 in the daylight photography mode, the shutter blade 38 rotates to the open position from the close position and returns to the close position while opening and closing the exposure opening 37. In this case, the shutter speed is set at 1/64 sec. During opening and closing operation of the shutter blade 38, the incident light of the taking lens 5 emitted from a subject passes through the small stop portion 66 and the large stop aperture 62a to expose the photo film. In this case, light amount is controlled by the small stop portion 66, therefore the small stop aperture 66a and the ND filter 66b control light amount as much as the aperture of f/32 does.

When photographing outdoors where flash emission is required, for example in the case of photographing against the light, the operation member 15 is slid in the operation opening 14 to select the daylight synchro photography mode as shown in FIG. 2.

When the operation member 15 is set in the daylight synchro photography mode, the light emission selecting switch is turned on and the signaling member 17 projects from the upper face of the unit body 3. The switching ring 68 is kept at the initial position. Therefore, the aperture changeover plate 63 is set at a small stop position in a manner similar to the daylight photography mode.

When photographing in the daylight synchro flash photography mode, light amount is controlled at the small stop 66 in a manner similar to the daylight photography mode.

The shutter speed is set at 1/64 sec. In this case, the flash light emits since the light emission selecting switch is turned on.

In the above daylight photography mode and the daylight synchro photography mode, light amount is controlled by the small stop aperture such as f/32. By combining the ND filter 66*b*, the small stop aperture 66*a* is set to f/16. Therefore, there are no deteriorations of an image formed on the photo film due to the diffraction of light which is caused by the excessively small stop aperture.

For photographing a dark subject such as a night view, the operation member 15 is rotationally moved to the night view synchronizing position from the daylight synchronizing position, to select the night view synchro photography mode.

When the operation member 15 is rotationally shifted to the night view synchro photography mode from the daylight synchro photography mode, the pressing lever 75 of the transmission plate 74 pushes the follower pin 68*c* of the switching ring 68 from the downside. Therefore, the switching ring 68 is rotationally shifted from the initial position against the bias of the spring 70. By rotational shift of the switching ring 68, the aperture changeover plate 63 is rotationally shifted to the large stop position, and the end portion 63*a* is away from the optical axis of the taking lens 5.

Moreover, by rotational shift of the operation member 15 from the daylight synchronizing position to the night view synchronizing position, the light reducing member 19 is set in front of the flashlight emitter 7 and the index plate 20 is disposed in front of the viewfinder 6. The light emission selecting switch is turned on and the signaling member 17 projects from the upper side of the unit body 3.

In the photographing in the night view synchro photography mode, the shutter opens and closes at the shutter speed of 1/64 sec. and the flash light emits in synchronism therewith. During opening and closing operation of the shutter blade 38, the incident light of the taking lens 5 emitted from a subject passes through the large stop aperture 62*a* of f/5.6 to expose the photo film. In photographing of night view, the illumination effect of the flash light is hardly expected since the subject is too far.

By selecting each photography mode as stated above, it is possible to photograph well in a blight place such as outdoors of fine day, to photograph a night view and a person with a background such as a night view. Since proper EV for the daylight photography mode and the daylight synchro photography mode is set to EV11, a proper EV for the night view synchro photography mode is set to EV6, it is possible to photograph well in a range between EV9 to 11 in any photography modes. Therefore, when user selects any photography modes in a brightness of EV9 to 11 which is difficult situation for user to select proper photography modes, it is possible to prevent failure of photographing.

The aforementioned embodiments describe the lens-fitted photo film unit including the daylight photography mode, the daylight synchro photography mode and the night view synchro photography mode, but the lens-fitted photo film unit may include the daylight photography mode and the night view synchro photography mode only, or the daylight synchro photography mode and the night view synchro photography mode only. Moreover, the lens-fitted photo film unit may include a night view synchro photography mode without flash emission, in place of the night view synchro photography mode.

Although the present invention has been fully described by the way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens-fitted photo film unit comprising:
    a photo film preloaded in said lens-fitted photo film unit, ISO sensitivity of said photo film being 3200;
    a shutter device disposed in a photography optical path for exposing said photo film, shutter speed of said shutter device being set at 1/64 sec.;
    a photography mode selection device for selecting at least one of first and second photography modes; and
    an aperture changeover means for controlling exposure amount on said photo film in cooperation with said photography mode selection device, said aperture changeover means being set in a small stop state when said first photography mode is selected, and being set in a large stop state when said second photography mode is selected, said exposure amount being controlled by a first aperture of f/16 and an ND filter having transmittance of 25% in said small stop state, and being controlled by a second aperture of f/5.6 in said large stop state.

2. A lens-fitted photo film unit according to claim 1, said aperture changeover means comprising:
    a large stop plate fixed in said photography optical path, said second aperture being formed on said large stop plate; and
    an aperture changeover plate movable in and out of said photography optical path, said first aperture being formed on said aperture changeover plate, said ND filter covering said first stop aperture.

3. A lens-fitted photo film unit according to claim 2, wherein said first photography mode is a daylight photography mode and said second mode is a night view synchro photography mode.

4. A lens-fitted photo film unit according to claim 3, further including a flash device which is turned on or off in cooperation with said photography mode selection device, said flash device being set in OFF state in the daylight photography mode and being set in ON state in the night view synchro photography mode.

5. A lens-fitted photo film unit according to claim 4, wherein said photography mode selection device is able to select a daylight synchro photography mode, in which said aperture changeover means is set in said small stop state and said flash device is set in said ON state.

6. A lens-fitted photo film unit according to claim 5, further including a flash light amount adjusting device for changing over flash light of said flash device to one of a normal state and a reduced light state in cooperation with said photography mode selection device, said flash light being set in said normal state in said daylight photography mode and daylight synchro photography mode, and being set in said reduced light state in said night view synchro photography mode.

7. A lens-fitted photo film unit according to claim 6, wherein said flash light amount adjusting device includes a light-shielding plate for partially shielding front of a projector of said flash device, said light-shielding plate being set away from the front of said projector in said normal state, while being set in front of said projector in said reduced light state.

8. A lens-fitted photo film unit according to claim 7, further including an index plate for cooperating with said photography mode selection device, said index plate coming into a viewfinder in said night view synchro photography mode, to display that said night view synchro photography mode is selected.

* * * * *